PORTABLE DISK-TYPE MAGNETIC RECORDING APPARATUS

Filed Sept. 30, 1954 2 Sheets-Sheet 1

INVENTOR.
Loren F. Jones
BY Morris A. Rabkin
ATTORNEY.

March 14, 1961 L. F. JONES 2,975,238

PORTABLE DISK-TYPE MAGNETIC RECORDING APPARATUS

Filed Sept. 30, 1954 2 Sheets-Sheet 2

INVENTOR.
Loren F. Jones
BY Morris A. Rabkin
ATTORNEY.

United States Patent Office 2,975,238

Patented Mar. 14, 1961

2,975,238

PORTABLE DISK-TYPE MAGNETIC RECORDING APPARATUS

Loren F. Jones, Philadelphia, Pa., assignor to Radio Corporation of America, a corporation of Delaware Filed Sept. 30, 1954, Ser. No. 459,481

2 Claims. (Cl. 179—100.2)

This invention relates to magnetic recording, and more particularly to a compact, portable, self-powered, magnetic recording-reproducing apparatus.

There are many occasions when persons in many varied occupations, such as doctors, lawyers, lecturers, authors, businessmen or housewives, find need for quickly and conveniently recording a thought, message or letter. Heretofore, it has been necessary to record such thoughts by writing them on paper. Portable sound recording apparatus has been proposed. However, such apparatus has been either bulky and inconvenient to have at hand, or has included a number of elements loosely connected by wires which must be handled before the apparatus can be operated If, for example, such a record is to be made while the person is driving a car, or otherwise in transit, either the written message or the handling of the previous equipment would be, at best, inconvenient. The recording device provided by the present invention may be pocket-sized. Since it may be withdrawn from the pocket to record a thought, the device may be considered to provide a pocket memory.

It is, therefore, an object of the present invention to provide an improved, compact, portable magnetic recording-reproducing apparatus featuring unitary construction.

It is another object to provide a recording-reproducing apparatus as set forth wherein the unitary structure is of a size to fit easily into a man's coat pocket or ladies handbag.

It is a further object of this invention to provide a recording-reproducing apparatus as set forth which is self powered and requires no association with ancillary equipment.

It is yet another object of this invention to provide a recording-reproducing apparatus as set forth wherein the record produced thereby is of a type suitable for inserting in an envelope for mailing.

The small, pocket-size recording-reproducing apparatus which has been provided by the invention for attaining all of these objects may be referred to as Memoplay magnetic recording-reproducing apparatus.

In accomplishing these and other objects, there has been provided, in accordance with the present invention, a unitary structure which includes a housing or case of a size suitable for carrying in a man's coat pocket. In the case, there is an acoustic transducer which may be used either as a microphone or as a loudspeaker. There is also housed within the case a recording-reproducing amplifier, a drive motor for a record member, mounting means for a disk magnetic record, a magnetic record transducer cooperatively associated with the record member, and control means for actuating the apparatus.

A better understanding of this invention may be had from the following detailed description when read in connection with the accompanying drawings, in which.

Figure 1:
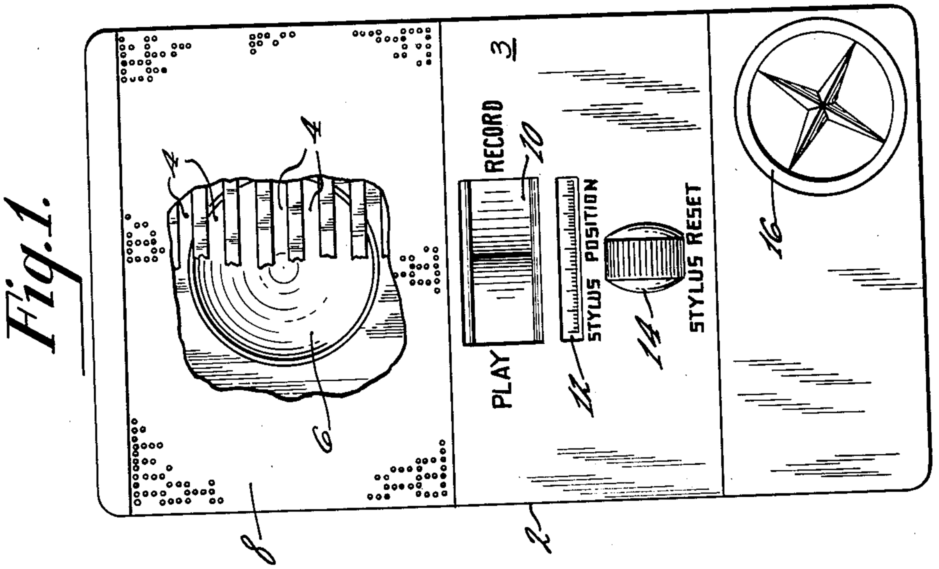
Fig. 1 is a front elevational view of a magnetic recording-reproducing apparatus embodying the present invention.

Referring now to the drawings in more detail, there is shown, in Fig. 1, a case member 2. This case has a front wall or face 3, side walls 5 and end walls 7. One end of the front face of the case member 2 is provided with an acoustic passage 4 or opening through which an acoustic transducer 6 is available. The opening is covered with a decorative, acoustically transparent screen 8.

There is also shown a conditioning switch operating handle 10 which extends through an opening in the front face 3 and which, as will be more fully set forth hereinafter, is normally biased to a neutral position but may be moved to either of two positions to condition the apparatus either for recording or reproducing. An indicator 12 is provided for indicating the position of an associated magnetic record transducer relative to a magnetic record member. These elements will be more fully set forth hereinafter. A control member 14 is provided whereby the record transducer may be positioned at the start of a record track on the record member. A knob 16 is operatively coupled to the spring of a spring motor whereby the energy storage spring may be conveniently wound up.

Figure 2:
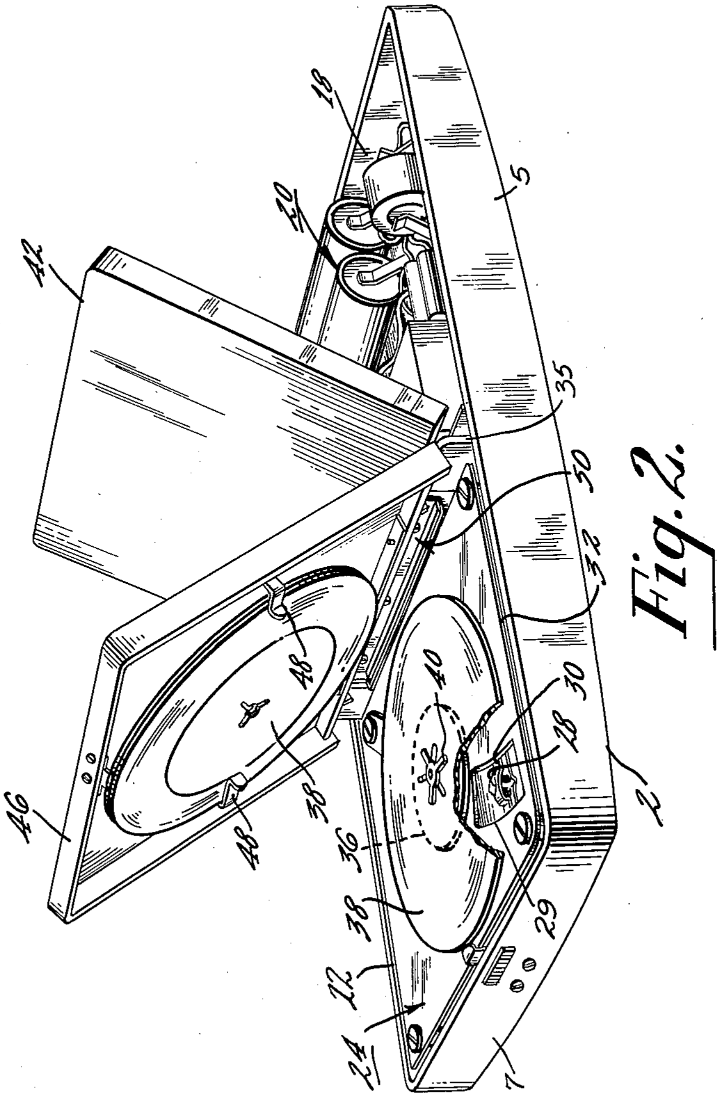
Fig. 2 is a rear perspective view of the apparatus shown in Fig. 1 and with the covers raised to show the contents of the case.

In Fig. 2, the case member 2 is shown face down. It may be seen that there are two compartments within the case 2. The case 2 is divided by a plate 55 extending between the side walls 5. One compartment 18 houses a battery powdered amplifier circuit 20 and the acoustic transducer 6. The second compartment 22 houses a spring motor 24, a gear train 26, and a magnetic record transducer 28 which is referred to, at times hereinafter as a magnetic head. The magnetic record transducer 28 is carried by a transducer arm 30 which is remotely pivoted.

The spring motor 24 and the gear train 26 are mounted between a pair of spaced mounting panels or plates 32 in a manner somewhat similar to that used in the assembly of spring wound clocks and watches. Only one of these plates is shown in the drawings. The speed of operation of the spring motor 24 and the gear train 26 is controlled by a suitable governor such as an air vane 34 indicated in Fig. 3. It will be appreciated that other types of governors, such, for example, as flywheel governors, may be used.

The output of the motor 24 through the gear train 26 is connected to drive a small turntable 36. A disk-shaped magnetic record member 38 is held in place on the turntable 36 by a suitable clamp 40. The disk record member 38 is preferably a relatively flexible disk of plastic material having either a surface coating or an impregnation of a suitable magnetizable iron oxide. Such oxides are well known in the art and need not be more specifically recited. Disk records of this type, which may be on the order of three inches in diameter, may conveniently be placed in an ordinary letter envelope for mailing. The disks are provided with an unmodulated spiral groove on at least one side, and preferably on both sides. The magnetic record transducer 28 is adapted to engage the grooved surface of the record member 38 when the record member is positioned on the turntable 36. As shown in the drawings, the plate 32 has an opening 29 therein through which the magnetic transducer 28 may project for co-operation with the magnetic disk record 38. Thus engaged, whenever the record member 38 is rotated, the transducer 28 is caused to track across the record member in a manner somewhat similar to the tracking of a phonograph pickup across its associated record. However, in the instant case, signals are recorded on the disk as magnetic impressions rather than as groove modulations.

As shown in Fig. 2, there is provided a cover member 42 for the first compartment 18. A cover member 46 is provided for the second compartment 22. These cover members provide the back wall of the case 2. Clamp means, such as spring clamps 48, may be positioned in the cover member 46 to hold a supply of spare record disks. The two cover members 42 and 46 may be attached to the body of the case member 2 as by suitable hinge means 50.

Figure 3:
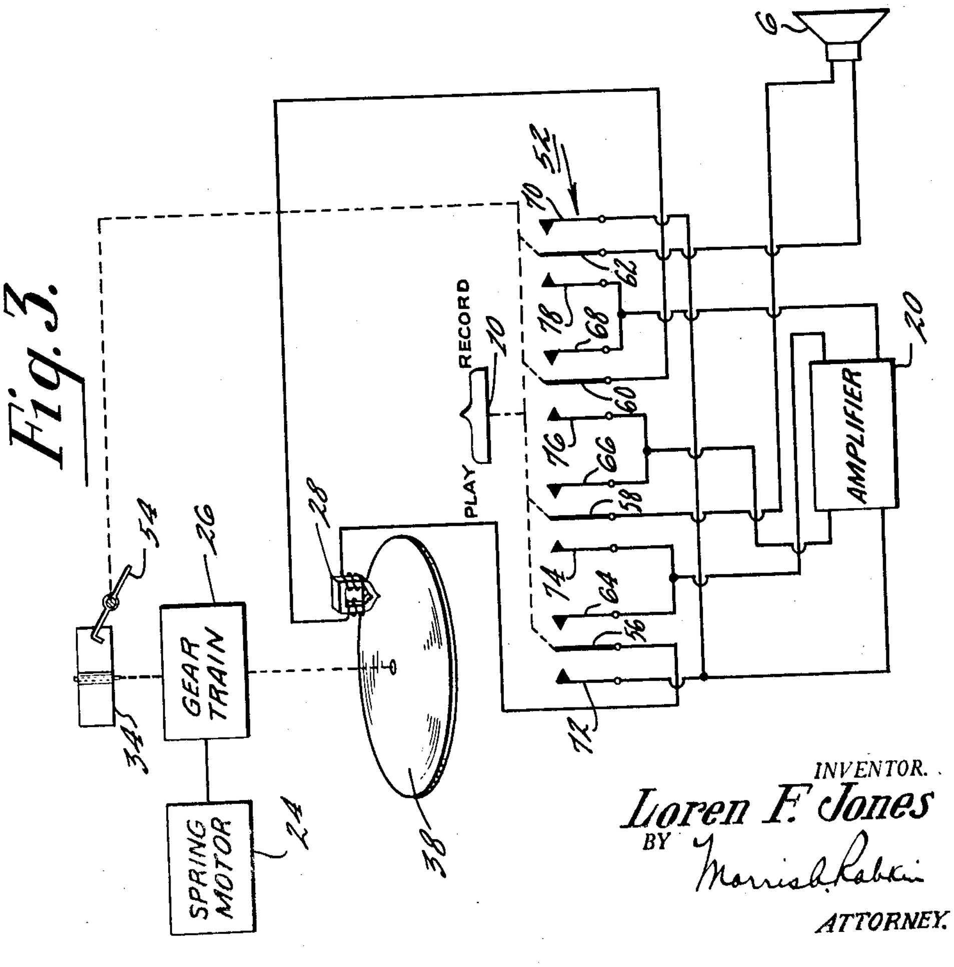
Fig. 3 is a schematic diagram of a system for magnetic recording and reproducing and embodying the present invention.

With particular reference to Fig. 3, it may be seen that the apparatus may be conditioned to operate either as a signal recording device or as a signal reproducing or playback device. As previously noted, there is provided a conditioning switch operating handle 10. This handle 10 is coupled to a conditioning switch 52. The switch handle is also coupled to a motor stop lever 54. The stop lever 54 may, as shown, be operatively associated with the governor 34 to prevent the operation of the motor whenever the operating handle is in a neutral position, as shown. However, whenever the handle 10 is moved to either of its operational positions, the lever 54 is disengaged from the governor 34, and the motor 24 is allowed to run.

As noted, the switch handle 10 may be moved to either of two operational positions designated on the drawings as "Record" and "Play." When the handle 10 is moved to the "Record" position, the movable spring blades 56, 58, 60, 62 of the conditioning switch 52 are moved to engage the corresponding righthand (as illustrated) contact members 64, 66, 68, 70, respectively. With all of the switch blades closed on the right-hand contact members, the acoustic transducer 6 is connected in the input circuit of the amplifier 20, while the magnetic record transducer 28 is connected in the output circuit of the amplifier 20. In this condition, the acoustic transducer 6 acts as a microphone, the output current of which is amplified and applied to the magnetic record transducer which acts as a recording head. It will be understood that the amplifier includes means for applying a suitable recording bias to the recording head during recording operations. When the handle 10 is moved to the "Play" position, the movable blades 56, 58, 60, 62 of the conditioning switch 52 are moved to engage the corresponding left-hand contact members 72, 74, 76, 78, respectively. With the switch blades closed on the left-hand contact members, the magnetic record transducer 28 is connected in the input circuit of the amplifier 20 while the acoustic transducer 6 is connected in the output circuit of the amplifier 20. In this condition, the magnetic record transducer 28 acts as a reproducing or playback head the output current of which is amplified and applied to the acoustic transducer which acts as a loudspeaker.

Since the motor stop lever 54 is actuated to be disengaged from the governor 34 whenever the handle 10 is moved to either of its operative positions, the motor 24 and the gear train 26 are conjointly operable with the conditioning switch 52.

Thus, it may be seen that there has been provided an improved, compact, portable Memoplay magnetic recording-reproducing apparatus featuring unitary construction of a size to fit into a man's coat pocket or ladies handbag, which is complete and self-contained, and which records on a readily mailable record member.

What is claimed is:

1. A magnetic recording-reproducing apparatus for using magnetic disk records comprising a unitary housing member having a front wall, a back wall, end walls and side walls, said housing being divided into a first internal compartment and a second internal compartment, said front wall having an opening therein, an acoustic transducer mounted in said first compartment of said housing member behind said opening, an amplifier circuit, a battery for powering said amplifier circuit, said amplifier circuit and battery being mounted in said first compartment with said acoustic transducer, a panel in said second compartment disposed between said front and said back walls, means disposed on one side of said panel for receiving one of said disk records in parallel spaced relationship with said panel, a motor for driving said one disk record, said motor being disposed in said second compartment and mounted on said panel, a magnetic head, and a transducer arm having said magnetic head attached to one end thereof, said arm and head being mounted in said housing on the opposite side of said panel, said panel having an opening therein immediately adjacent said record, said arm being pivotally mounted in said housing with said head projecting through said opening in position to cooperatively engage said one magnetic disk record, and a switch mounted in said housing and connectable to said transducer and to said amplifier circuit, said switch being operative to connect said acoustic transducer in the input of said amplifier circuit and to connect said magnetic head in the output of said amplifier circuit to condition said apparatus for recording, said switch being also operative to connect said acoustic transducer in the output of said amplifier circuit and to connect said magnetic head in the input of said amplifier circuit to condition said apparatus for reproducing, and said motor being conjointly operable with said switch to cause rotation of said one disk record when said switch is conditioned for either recording or for reproducing.

2. Magnetic recording-reproducing apparatus cooperable with a magnetic disk record comprising a unitary, enclosable housing member having front and back walls connected by edge walls, a panel disposed within said housing member between said front and back walls, said panel having inner and outer opposite sides each facing one of said front and back walls, a rotatable member disposed immediately adjacent said outer side of said panel for driving a magnetic disk record when said record is disposed in contact with said record driving member and when said record is in parallel spaced relationship with said outer side, a motor disposed in said housing on the inner side of said panel, said motor being coupled to said rotatable member, a magnetic transducer cooperable with said record for recording and reproducing thereon, an arm carrying said transducer over said record, said arm being mounted in said housing member, said panel having an opening therein under said record, said arm being disposed adjacent said inner side of said panel with said transducer projecting through said opening for contact with said record, an acoustic transducer mounted in said housing member and being disposed against said front wall, and means including a control device mounted in said housing member connectable to said magnetic transducer and having an operating element extending through one of said walls of said housing member for alternatively conditioning said magnetic transducer for recording signals on said record in response to sound applied to said acoustic transducer and for reproducing signals recorded on said record through said acoustic transducer.

References Cited in the file of this patent

UNITED STATES PATENTS

| | | |
|---|---|---|
| 2,097,323 | Hill | Oct. 26, 1937 |
| 2,186,500 | Schnell | Jan. 9, 1940 |
| 2,525,926 | Matthews | Oct. 17, 1950 |
| 2,532,803 | Faus | Dec. 5, 1950 |
| 2,713,618 | McNabb | July 19, 1955 |

FOREIGN PATENTS

| | | |
|---|---|---|
| 685,923 | Great Britain | Jan. 14, 1953 |